US008652576B2

(12) United States Patent
Hernandez Delsol et al.

(10) Patent No.: US 8,652,576 B2
(45) Date of Patent: Feb. 18, 2014

(54) METHOD AND SYSTEM TO FORM DELETION WINDOWS ON A GLASS SUBSTRATE

(75) Inventors: Alberto Hernandez Delsol, Nuevo León (MX); Jesús Alberto Gonzalez Rodriguez, Nuevo León (MX); Miguel Arroyo Ortega, Nuevo León (MX)

(73) Assignee: Vidrio Plano de Mexico, S.A. de C.V., Nuevo Leon (MX)

( * ) Notice: Subject to any disclaimer, the term of this patent is extended or adjusted under 35 U.S.C. 154(b) by 235 days.

(21) Appl. No.: 13/182,041

(22) Filed: Jul. 13, 2011

(65) Prior Publication Data

US 2013/0017344 A1    Jan. 17, 2013

(51) Int. Cl.
*B05D 1/32*    (2006.01)
*B05D 3/00*    (2006.01)

(52) U.S. Cl.
USPC ........... 427/269; 427/259; 427/261; 427/266; 427/289.7

(58) Field of Classification Search
USPC .................. 427/269, 259, 261, 266, 289.7
See application file for complete search history.

(56) References Cited

U.S. PATENT DOCUMENTS

| 5,449,312 | A | 9/1995 | Lisec |
| 5,492,750 | A * | 2/1996 | Shumaker et al. ............ 428/192 |
| 5,986,234 | A | 11/1999 | Matthews et al. |
| 6,387,542 | B1 * | 5/2002 | Kozlov et al. ................. 428/673 |
| 6,445,503 | B1 | 9/2002 | Lingle |
| 6,495,261 | B1 * | 12/2002 | Gagliardi et al. ............. 428/426 |
| 6,582,527 | B2 | 6/2003 | Marazzi et al. |
| 7,037,588 | B2 | 5/2006 | Decroupet |
| 7,807,248 | B2 | 10/2010 | German et al. |
| 2007/0090092 | A1 | 4/2007 | Forstner et al. |

* cited by examiner

*Primary Examiner* — Frederick Parker
(74) *Attorney, Agent, or Firm* — Abelman, Frayne & Schwab

(57) ABSTRACT

A method and a system is provided to form deletion windows on a glass substrate. The method includes the steps of applying a provisional masking substance of the glass substrate for masking predetermined regions of said glass substrate. The method also includes applying a reflective material on the glass substrate including the provisional masking substance. The method further includes applying heat to the glass substrate for removing the provisional masking substance of the glass substrate forming the deletion windows.

10 Claims, 4 Drawing Sheets

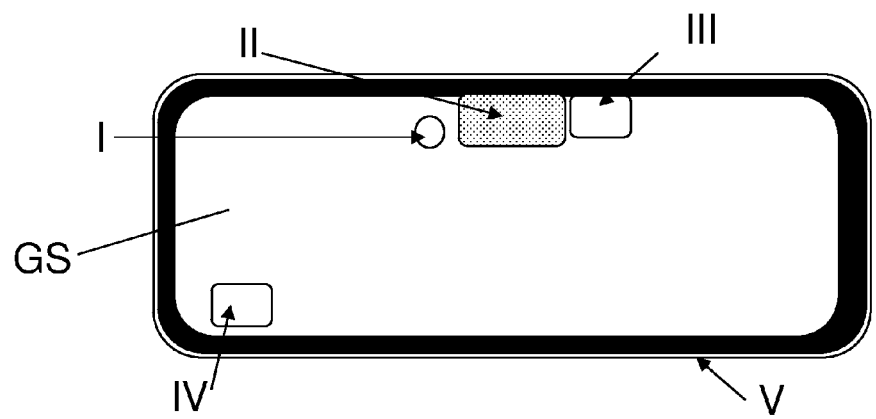
FIGURE 3
FIGURA 4

METHOD AND SYSTEM TO FORM DELETION WINDOWS ON A GLASS SUBSTRATE

BACKGROUND OF THE INVENTION

1. Field of the Invention

This invention relates to a method and system to form deletion windows on any coated glass substrate using an enamel paint to temporarily cover such areas during the reflective coating application, and then remove it by burning such enamel leaving exposed the desired opening areas on the glass (deletion windows).

2. Description of the Related Art

On the current automotive glass market there has been an increasing need for glasses that prevent the solar radiation from penetrating into the automobile cabin causing undesired heat and for causing additional fuel consumption to operate the air conditioning system for longer periods of time trying to cool it down. A well known solution known to automotive glass manufacturers are the reflective coated glasses that use a multilayer metallic coat applied using a coater as described in U.S. Pat. No. 4,166,018 to Airco, to reflect a big portion of the Infra Red spectrum of the solar light (700 to 2500 nanometers wavelength). The reflective property is given by one or several layers of silver nano particles applied in between other specialized metallic coats, as described in U.S. Pat. Nos. 6,445,503 by Guardian, 7,807,248 by Cardinal or 7,037,588 by Glaverbel.

Typical glass coating compositions for a triple silver layer system including: glass; $TiO_2$ (layer1); ZnO (layer 2); Ag (layer 3); NiCr (layer 4); $SnO_2$ (layer 5); ZnO (layer 6); Ag (layer 7); NiCr (layer 8); $SnO_2$ (layer 9); ZnO (layer 10); Ag (layer 11); NiCr (layer 12); $SnO_2$ (layer 13); and $Si_3N_4$ (layer 14).

The problem with this solution is that all those metallic coats also act as a barrier for the Electro Magnetic Fields commonly used in the transmission of signals (Radio, GPS, Garage door openers, TV, Toll Road Cards, etc.). Another problem is the corrosion caused when the coat is in direct contact with the atmospheric elements (humidity, acid rain, cleaning agents, etc). A simple solution for this problem has been the addition of areas where the metallic coat is removed, either strategically located or at a minimum all around the edge of the glass; these areas are commonly named "deletion windows" and act as access ports for all those electromagnetic signals and, in case of edge deletion, they seal the reflective coat from the effect of the atmospheric elements.

Currently there are different methods and systems to generate opening areas on coated glass consisting mainly of methods to attack the coating by: abrasion, laser, plasma or chemicals. The actual coat removal methods and systems are associated with high operating cost mainly due to the high defective rate coming from the coat damage due to handling and the need for specialized production processes to avoid any contact with the coat that is extremely fragile.

For example, U.S. Pat. No. 5,449,312 of Peter Lisec, describes a device for cutting a glass sheet with the help of a cutting tool, which can be rotated around an axis perpendicular to a supporting surface for the glass sheet to be machined, and for removing a coating, applied on the glass sheet, with the help of a grinding tool, which removes the coating from the glass sheet in strips lying on both sides of the scratch lines, running parallel to the grinding tool, with a beam, which is guided movably over the supporting surface on its edges, and with a cutting tool, as well as a grinding tool, which are guided movably on the beam along the same path. Those mechanisms allow the grinding wheel to be moved through the areas where the coat is to be removed.

However, this method requires special attention to the grinding wheel condition and the cleanliness of the working area since a worn out wheel can cause permanent damage to the glass or an uneven coat removal.

The method and system is limited in precision and cannot handle tight radius or narrow-small size areas very well, due to the fact that the grinding wheel contact area, the applied pressure and the form are changing with use.

An alternative method which in fact is a derivation of the grinding wheel method is the one developed by Saint Gobain (US patent application US2007/0090092 A1) where the grinding wheel is replaced by plasma heads that depending on their size and form a system will move such heads around the glass surface turning the plasma on and off according to the deletion windows design.

Advantages of this innovative system are cleanliness and the precision of the form removed area. This application suggests high operational cost. Also under this scenario the coated glass needs to be handled with extra care to avoid handling damage. However, the production equipment capable to handle coated glass with minimal damage is highly expensive and also requires costly maintenance routines.

Other alternative to remove the glass coating is shown in the U.S. Pat. No. 5,986,234 of Matthews, et al, which describes a compact laser system that removes surface coatings (such as paint, dirt, etc.) at a removal rate as high as 1000 $ft^2$/hr or greater without damaging the surface. A high repetition rate laser with multiple amplification passes propagating through at least one optical amplifier is used, along with a delivery system consisting of a telescoping and articulating tube which also contains an evacuation system for simultaneously sweeping up the debris produced in the process. The amplified beam can be converted to an output beam by passively switching the polarization of at least one amplified beam. The system also has a personal safety system which protects against accidental exposures.

However, one problem with this method is that the time taken by the laser to remove the material is too long, making it unsuitable for large areas like the ones expected on automotive products. Maintenance and operational cost of the laser generator is also very expensive.

In other industries, such as fiber optic production and installation, they have adopted a method where special chemicals that dissolve the external coat are applied on the fiber to expose the fiber only on the specific area that is required.

For example, a method for removing a coating from a portion of optical fiber is described in U.S. Pat. No. 6,582,527 of Marazzi, et al. This method consists of immersing the coated fiber in a special acid. The acid will dissolve only the coating material, while exposing the fiber without causing any damage.

The method described in U.S. Pat. No. 6,582,527, even though it is interesting is extremely risky to be used with large pieces like automotive windshields. During the process the portion of the coat that needs to remain on the glass must be covered to be protected from the acid to avoid damages in case of spills. This makes this process extremely complicated and not suitable for our purposes.

Other problems associated with processing coated glass is the fragility of the coat itself. The coat is an exposed composition of ultra thin layers of metallic components like oxides that can be easily damaged by corrosion and or abrasion. This coat increases its chemical and mechanical resistance once it is heated above 620° C. (after bending), where it can be handled in a manner similar but not the same as the standard methods due to the properties of the coat.

Based on the above the purpose of this invention is to accomplish the processing of automotive (reflective laminated sidelites or windshields) or architectural glass (energy efficient windows) that can contain, as part of their design, deletion windows of a controlled form and size and or edge deletion areas.

In accordance with the above, the present invention considers the application of the coating to a precut and premasked deletion areas on the glass using instead a special enamel cut to form and then remove the coat starting from a glass bracket with the coat already on its surface.

With the proposed method, the glass with no coat will be handled on regular production lines with no risk of damage to the coat because it is not as yet on the glass, thus eliminating the need of large investments on specialized production lines. To generate the deletion windows, the proposal is to use an organic enamel, which can be applied with the current serigraphic painting machines, widely used in the automotive glass fabrication process, then to dry this paint using a regular IR oven. This will provide enough mechanical resistance to the enamel for the handling, packing, shipping and washing prior to the glass coater. Another characteristic of this proposed enamel is that it will not release any component into the coater atmosphere avoiding any kind of contamination.

It is important to note that under this proposed method and system, there is no limitation with respect to the glass forms and deletion windows designs. All that is needed is a new printing screen with the desired window form and size and to paint this pattern over the glass to be coated.

Another important benefit is that the glass can be stored under regular conditions, not like the coated glass that demands special temperature and humidity (≤50%) control to avoid the metallic coat becoming oxidized.

OBJECTIVES OF THE INVENTION

Therefore, it is a main objective of the present invention to provide a method and system to form deletion windows on a reflective coated glass substrate, for removing the masking enamel once the coat is applied and just before the pair of glasses are placed into the furnace to produce a windshield or reflective laminated sidelites.

It is another objective of the present invention to provide a method and system to form deletion windows on a reflective coated glass substrate, wherein the enamel is an organic based paint selected from the group consisting of epoxy resins, and organo-functional silanes or mixtures of the same, and titanium dioxide as a pigment, that will burn out at a temperature in the range such as 280° C. to 500° C., when exposed for a time in the range of 5 min to 15 min. It will be carbonized eliminating the original mechanical bonding of the paint and therefore the bonding of the coat with the enamel. The ash product of the enamel carbonization can be easily removed by the regular after bending washing process (Assembly) existing on all windshield manufacturing processes, leaving a well-defined deletion window where originally the paint was printed.

It is another objective of the present invention to provide a method and system to form deletion windows on a reflective coated glass substrate, to process coated glass with or without deletion areas, without the need for special processing equipment and with very low to zero coat damage due to handling, by changing the process sequence of applying the coat once the glass is cut and edge finished where the deletion areas are covered by a special enamel that will be carbonized and removed together with the coating sections in said deletion areas.

An additional objective of the present invention is to provide a method and system to form deletion windows on a reflective coated glass substrate, which can coat the glass on the current regular production lines, thus eliminating the need for large investments, and to load a coater with precut glass forms that can be of the same model or color or another model or color.

Another objective of the present invention is to provide a method and system to form deletion windows on a reflective coated glass substrate, wherein the enamel from the family of the organic inks, is applied to the glass surface using the serigraphic method and, after drying the paint, using a regular IR or UV curing oven.

An additional objective of the present invention is to provide a method and system to form deletion windows on a reflective coated glass substrate, wherein the enamel is burned before the bending process in a glass sheet is carried out. The enamel is burned out by means of a complementary IR furnace that works at a temperature range between 280° C. and 500° C.

BRIEF DESCRIPTION OF THE DRAWINGS

FIG. 3 is a top view of a glass sheet showing examples of the most commonly used deletion windows on coated glass substrate;

FIG. 4 shows a side view of a none coated glass substrate with an enamel applied over the deletion windows areas of said none coated glass substrate;

DETAILED DESCRIPTION OF THE INVENTION

Figure 1:
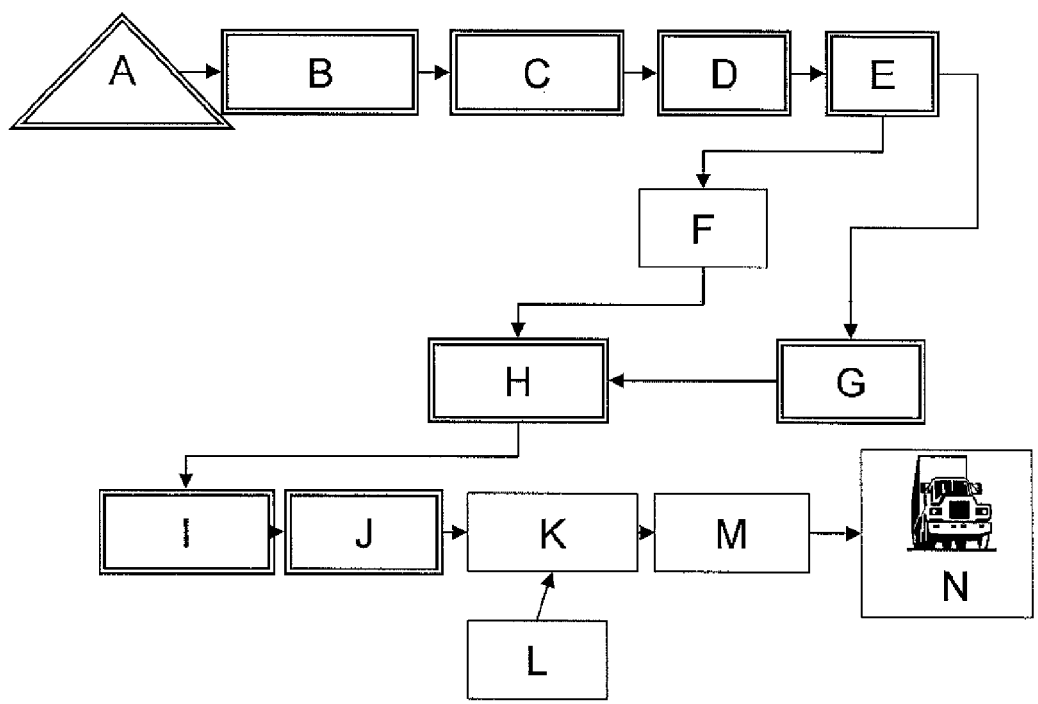
FIG. 1 is a schematic diagram detailing the steps of a prior art system to produce "deletion windows" on coated glass substrate on a regular production process.

In accordance with the prior art, FIG. 1 shows a schematic diagram, describing a traditional production of coating windshields with edge deletion or deletion windows.

In the schematic diagram of FIG. 1, a set of coated glass sheets (step A), are cut in different sizes (short and long sheets) (step B). After the coating is removed from the long sheets, in areas previously selected or edge deletion areas (step C), to permit the transmission of electro magnetic fields commonly used in the transmission of signals (Radio, GPS, Garage door openers, TV, Toll Road Cards, etc), these areas are commonly named "deletion windows" which act as access ports for all those electromagnetic signals and in case of the edge deletion, they seal the reflective coat from the effect of the atmospheric elements. The problems which arise when removing the coating from a glass sheet to form the "deletion windows" have been widely described in the prior art.

In step D, the edge of the glass sheets are finished (seaming or grinding) according to the product specifications. In step E, the cut and edge finished glasses are washed on a regular production washer machine.

After the short and long sheets are separated and the short sheet (step F) is decorated in some areas, with a ceramic frit layer, for example, to protect the adhesive that bonds the glass to the vehicle from the ultraviolet rays of the sun, to hide electrical wires and other hardware behind the glass, and also to provide a filter for the amount of sunlight allowed into the vehicle such as "half tones" on the moon roof and certain backlites. Meanwhile, in step G, a release or departing agent (i.e. a separating power) is applied to the long sheet to provide a temporary protection for a surface, as well as an interleaving material for protection and separation of adjacent surfaces.

In the step H, the short and long sheets are formed in pairs. In step I, the glass sheets are subjected to a bending process to provide a curvature for use, e.g., in an automobile window.

In step J, the glass sheets are washed before the assembly. In step K, two pieces of glass with a layer of polyvinyl butyral (PVB), which is provided in step L, are encased therebetween to form a windshield. In this step K, a vacuum process is applied to hold the PVB layer in place between the glass sheets to remove air bubbles. Thereafter, the glass sheets are put into an oven called an autoclave (step M) which heats the assembled windshield. The entire setup reaches 135° C. to 145° C., thereby melting the PVB, making it transparent, and fusing the three layers into one. The quality of lamination, or adhesiveness between the PVB and the glass sheets, are dependent on the temperature within the autoclave and the effectiveness of the pressure on the glass sheets and PVB.

Once the product has been assembled, the glass product is shipped to a customer location (step N) for sale.

Now making reference to FIGS. 2 to 7, the method and system to produce coated automotive glass with "deletion windows" in accordance with the present invention will now be described.

Figure 2:
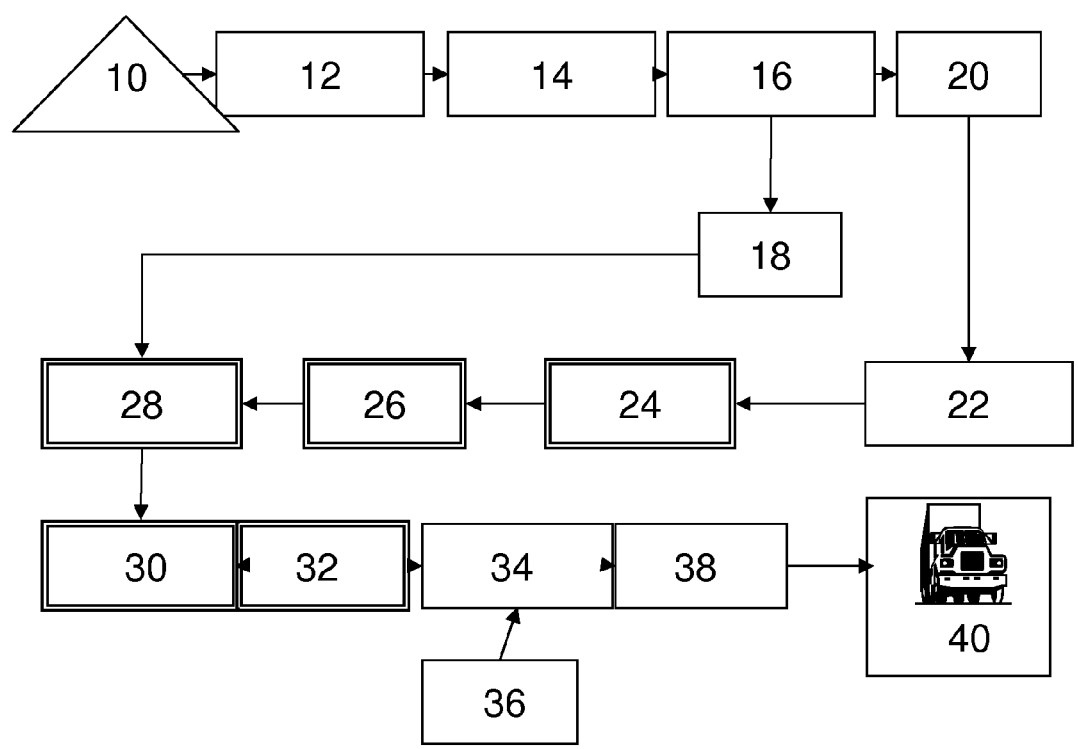
FIG. 2 is a schematic diagram of the method steps in relation to the system for processing a coated glass substrate with or without deletion windows, in accordance with a preferred embodiment of the present invention.

Referring now to FIG. 2, the schematic diagram of the method steps in relation with the system for the processing coated glass substrate with edge deletion or deletion windows or both comprises the following steps:

A set of non-coated glass sheets (step 10) are cut in different sizes (short and long sheets) (step 12).

In step 14, the edge of the short and long glass sheets are finished (seaming or grinding) according to the product specifications. In step 16, the cut and edge finished glasses are washed on a regular production washer machine.

Thereafter, the short and long sheets are separated, the short sheet (step 18) is decorated in some areas, with a ceramic frit layer, for example, to protect the adhesive that bonds the glass to the vehicle from the ultraviolet rays of the sun, to hide electrical wires and other hardware behind the glass, and also to provide a filter for the amount of sunlight allowed into the vehicle, such as "half tones" on the moon roof and certain backlites, which is similar to step F in FIG. 1.

Meanwhile, in step 20, the long sheet (b) is printed with an enamel, to print "the deletion windows" over the long glass sheet (b). The enamel is applied by means of a screen printing device to apply the enamel on predetermined regions to said glass sheet or substrate. The printing device applies the enamel using a serigraphic method and, after drying the paint, using a regular IR or UV curing oven.

The painted area (a) in FIG. 4, is identical as the deletion edge or "deletion windows" and can be easily modified using a new printing screen. The most commonly used "deletion windows" in a windshield GS (FIG. 3) are the traffic control VICS device (I); rain sensor, line departure camera, garage door opener (II); toll gate prepaid card (III); GPS, satellite radio (IV); and edge deletion to avoid metallic coat oxidation (V).

In step 22, the glass sheet (b) with the painted area (a) now passes through regular production equipment like infrared, convective or ultraviolet drying oven, to dry out all the enamel solvents, normally using a temperature in a range of 150° C. to 250° C. for a residence time such as 10 to 20 minutes.

Figure 5:
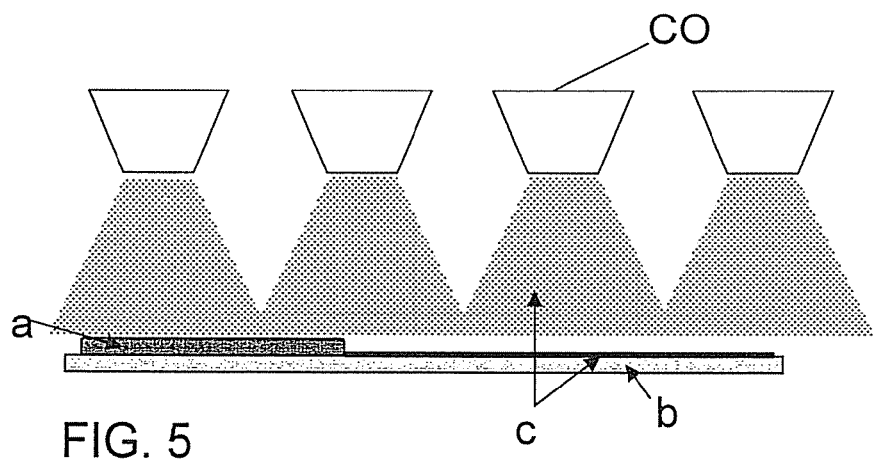
FIG. 5 shows a schematic elevation view showing the enamel and coating steps to form deletion windows on any coated glass substrate.
Figure 6:
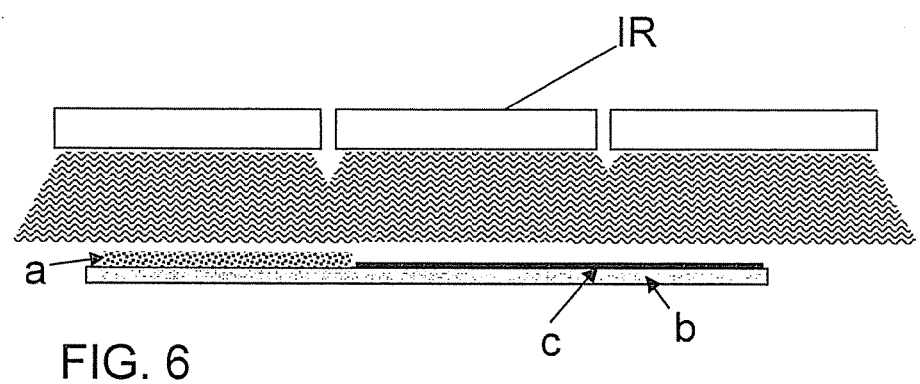
FIG. 6 is a schematic elevation view, according to the present invention, showing the step of applying infrared energy to carbonize the enamel to form deletion windows on any coated glass substrate.
Figure 7:
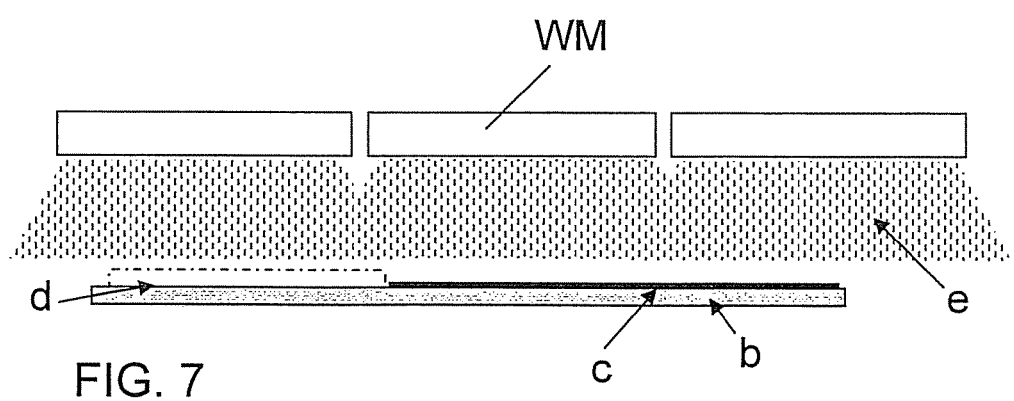
FIG. 7 is a schematic elevation view showing the washing step to clean the carbonized enamel from the glass substrate to form deletion windows on any coated glass in accordance with the present invention.

Thereafter, the long sheet (b) with the painted area (a) will be pre-washed and loaded into a coating line (coater) CO, which is a schematic shown in FIG. 5, to apply a multi layer metallic coating film (c) over the side of the glass that creates the reflective properties.

The coated glass (b) will now be heated in an infrared oven (IR) or convective oven to a temperature in a range from 280° C. to 550° C. over sufficient time, most of the time being between 5 to 15 minutes to carbonize the applied enamel. This action allows time to remove the enamel (step 24 in FIG. 2) to glass bonding preparing it for a later removal.

In step 26, a release or departing agent (i.e. a separating power) is applied to the long glass sheet (b) to provide a temporary protection for a surface, as well as an interleaving material for protection and separation of adjacent surfaces.

In the step 28, the short and long sheets are formed in pairs. In step 30, the glass sheets are subjected to a bending process to provide a curvature for use, e.g., in an automobile window.

In step 32, the short and long glass sheets are loaded onto a glass washer equipment WM (FIG. 7) where by means of the high pressure water nozzles and the use of some auxiliary mechanical cleaning device, for instance brushes, the carbonized enamel (a), now in the form of ashes (d) will be cleaned from the glass surface (b) together with the coat deposited (c) applied over said enamel (a).

The action of removing the enamel ashes and the inherent coating, will leave as a consequence "non-coated areas" on the glass surface identical in form and size to the desired "deletion windows".

The control of the form and size of the deletion window is dependant on the customer design which is translated onto a printing screen which is used on the printing machine to print the image on the glass.

Finally, the bending and washed glass sheets are now being assembled in pairs, including a layer of polyvinyl butyral (PVB) 36 between the same to form a windshield (step 34). Thereafter, the glass sheets are put inside an oven called an autoclave (step 38) which heats the vacuumed windshield, as was previously described.

Once the product has been assembled, the glass product is shipped to a customer location (step 40) for sale.

The present invention has been described in an illustrative manner. It is to be understood, that the terminology that has been used, is intended to be in the nature of words of description rather than of limitation.

Many modifications and variations of the present invention are possible in light of the above teachings. Therefore, the present invention may be practiced other than as specifically described.

We claim:

1. A method of forming deletion windows on a glass substrate, comprising the steps of:
   providing a glass substrate;
   applying a provisional organic masking substance on the glass substrate for masking predetermined regions of said glass substrate;

applying a reflective material on the glass substrate including the provisional masking substance; and applying heat to the glass substrate for removing the provisional masking substance of the glass substrate to form the deletion windows.

2. The method of forming deletion windows on a glass substrate as set forth in claim 1, wherein said provisional masking substance is an enamel.

3. The method of forming deletion windows on a glass substrate as set forth in claim 2, wherein the enamel is selected from the group consisting of epoxy resins, organo-functional silanes and mixtures of the same.

4. The method of forming deletion windows on a glass substrate as set forth in claim 1, wherein the step of applying a provisional masking substance includes the step of drying the provisional masking substance in an infrared, convective or ultraviolet drying oven.

5. The method of forming deletion windows on a glass substrate as set forth in claim 4, wherein the provisional masking substance is dried at a temperature between about 150° C. and about 250° C. for a time period between 10 and 20 minutes.

6. The method of forming deletion windows on a glass substrate as set forth in claim 1, wherein said step of applying heat to the glass substrate comprises: applying heat to the glass substrate within a range of about 280° C. to about 550° C. to burn out the provisional masking substance for forming the deletion windows on said glass substrate.

7. The method of forming deletion windows on a glass substrate as set forth in claim 6, wherein said step of applying heat to the glass for removing the provisional masking substance includes washing the glass substrate for cleaning ashes of the provisional masking substance after said provisional masking substance has been burned-out.

8. The method of forming deletion windows on a glass substrate as set forth in claim 1, wherein said step of applying heat comprises heating with either infrared energy or convective energy.

9. The method of forming deletion windows on a glass substrate as set forth in claim 1, wherein said provisional masking substance is applied by means of a screen printing device, said screen printing device including a design of the predetermined regions.

10. The method of forming deletion windows on a glass substrate as set forth in claim 3, wherein the enamel includes titanium dioxide as a pigment.

* * * * *